United States Patent
Ross et al.

(10) Patent No.: US 7,655,822 B2
(45) Date of Patent: Feb. 2, 2010

(54) REACTOR WITH TWO FLUIDIZED REACTION ZONES WITH AN INTEGRATED GAS/SOLID SEPARATION SYSTEM

(75) Inventors: Joseph Ross, Princeton, NJ (US); Thierry Gauthier, Brignais (FR); Régis Andreux, Francheville (FR)

(73) Assignee: Institut Francais du Petrole, Rueil Malmaison Cedix (FR)

( * ) Notice: Subject to any disclaimer, the term of this patent is extended or adjusted under 35 U.S.C. 154(b) by 338 days.

(21) Appl. No.: 11/641,113

(22) Filed: Dec. 19, 2006

(65) Prior Publication Data

US 2007/0213573 A1   Sep. 13, 2007

(30) Foreign Application Priority Data

Dec. 20, 2005   (FR) .................................. 05 13208

(51) Int. Cl.
  *C07C 1/00*  (2006.01)
  *F27B 15/08*  (2006.01)
(52) U.S. Cl. .................... 585/240; 208/78; 208/113; 422/144; 422/145; 422/147; 585/638
(58) Field of Classification Search ................. 422/139, 422/144, 145, 147; 208/78, 113; 55/348, 55/459.1; 585/638
See application file for complete search history.

(56) References Cited

U.S. PATENT DOCUMENTS

| | | | |
|---|---|---|---|
| 2,461,958 A | | 2/1949 | Bonnell |
| 3,188,185 A | | 6/1965 | Slyngstad et al. |
| 3,791,962 A | | 2/1974 | Demmel et al. |
| 3,993,556 A | | 11/1976 | Reynolds et al. |
| 4,500,423 A | * | 2/1985 | Krug et al. .................. 208/161 |
| 4,789,458 A | | 12/1988 | Haddad et al. |
| 4,818,372 A | * | 4/1989 | Mauleon et al. ............. 208/113 |
| 4,978,440 A | | 12/1990 | Krambeck et al. |
| 5,112,576 A | | 5/1992 | Kruse et al. |
| 5,259,855 A | * | 11/1993 | Ross et al. ..................... 55/349 |
| 5,837,129 A | * | 11/1998 | Ross et al. .................. 208/161 |
| 6,166,282 A | * | 12/2000 | Miller ......................... 585/638 |
| 6,296,812 B1 | * | 10/2001 | Gauthier et al. ............. 422/144 |
| 6,641,715 B1 | * | 11/2003 | Gauthier ...................... 208/78 |
| 6,797,026 B2 | * | 9/2004 | Sechrist et al. ................ 55/348 |
| 7,220,351 B1 | * | 5/2007 | Pontier et al. ............... 208/113 |
| 7,429,363 B2 | * | 9/2008 | Yuan et al. .................. 422/147 |

* cited by examiner

*Primary Examiner*—N. Bhat
(74) *Attorney, Agent, or Firm*—Millen, Zelano, Branigan, P.C.

(57) ABSTRACT

A gas-solid reactor and method including two fluidized reaction zones having an integrated gas-solid separation system which achieves rigorously controlled residence times in the reactor.

25 Claims, 2 Drawing Sheets

REACTOR WITH TWO FLUIDIZED REACTION ZONES WITH AN INTEGRATED GAS/SOLID SEPARATION SYSTEM

FIELD OF THE INVENTION

The invention relates to a novel type of gas-solid fluidized bed reactor having an integrated gas-solid separation system i.e. completely within the reaction assembly. The term "reaction assembly" means the succession of the various reaction zones which, in the case of the present invention, comprise at least one zone functioning in dense or fast fluidized bed mode followed by a second zone functioning in transported fluidized bed mode, which for simplicity is termed a transported bed. That zone in transported mode is often termed a "riser".

With a conventional catalytic cracking catalyst, dense fluidization is generally observed at between about 1 cm/s and 30 cm/s. Fast mode fluidization extends approximately from 30 cm/s to 1 m/s.

Entrained bed fluidization is produced in the riser of catalytic cracking units in which the gas rates typically range between 2 m/s to 7 m/s at the bottom of the riser to between 10 m/s and 30 m/s at the top thereof.

The fluidization rates are given here by way of example, and for catalytic cracking particles the size of which is typically in the range 50 to 80 microns. The skilled person will know that the boundaries between those various modes are not rigid and depend on the characteristics of the solid particles and the nature of the fluidization gas.

Fluidized bed reactors are encountered which have a plurality of fluidization modes in the catalytic cracking units, in certain fluidized bed boilers, in the synthesis of acrylonitrile, in Fischer-Tropsch syntheses, in reactors for polymerizing olefins to form polyethylene, and in processes allowing the conversion of methanol into olefins.

Since that list is not exhaustive and the present application is applicable to any process using a gas-solid fluidized reactor having at least two reaction zones—a first zone functioning in dense or fast fluidization mode as defined above followed by a second zone functioning in transported mode. The terms "first" and "second" are with respect to the direction of flow of the fluids.

The invention also concerns a device for gas-solid separation located at the outlet from the second transported bed reaction zone, said gas-solid separation device allowing strict control of the residence time of the gas in the transported bed reaction zone and in the separation system itself.

The advantage of the concatenation described in the present invention consisting of a first zone functioning in dense or fast bed mode followed by a second zone functioning in transported bed mode itself followed by a gas-solid separation device is to allow a gradation of the residence times between the various zones, the longest residence time being obtained in the first reaction zone (functioning in dense or fast bed mode) within which the majority of the reactions occur, followed by a shorter residence time in the second reaction zone operating in transported mode. It is also possible to carry out the fast reactions in the second reaction zone by injecting secondary reagents into said zone or by modifying the temperature of the flow by injecting a hot or cold fluid depending on the desired application into said transported zone.

Throughout the text, the term "residence time" will be used to define the ratio between the volume of the reaction zone concerned and the gas flow rate, and the "contact time" as the volume of the catalytic phase in the reaction zone concerned with respect to the gas flow rate. The contact time can more precisely define the characteristic time for carrying out the catalytic reaction.

Examination of the Prior Art

The prior art concerning fluidized bed reactors for FCC units is vast and will be limited here to an examination of documents containing a description of a gas-solid separation device at the riser outlet.

United States document U.S. Pat. No. 4,978,440 describes a catalytic cracking process using a riser type reactor with injection of a cooling fluid carried out above the dense phase located downstream of the riser. Gas-solid separation is achieved by a set of cyclones connected directly to the riser. This gas-solid separation device is entirely different to that described in the present invention.

U.S. Pat. No. 5,112,576 describes a catalytic cracking unit having a catalyst separation system at the riser outlet which is composed of an internal cyclone positioned inside a release chamber, followed by a separation system external to said chamber. That separation device is completely different from that described in the present invention.

U.S. Pat. No. 4,789,458 describes a catalytic cracking process in which the stripping zone and the regeneration zone have specific temperatures. The gas-solid separation device at the riser outlet is of the cyclone type directly connected to the riser.

None of the documents cited above describes a reaction zone configuration in which the riser (which can be identified as the second reaction zone functioning in transported mode of the present invention), is preceded by a first reaction zone functioning in dense or fast mode. None of the documents cited describes a gas-solid separation system at the riser outlet such as that forming part of the present invention. Now, the skilled person will be aware that the gas-solid separation system located at the riser outlet can limit degradation reactions of the products from primary cracking and thus play an important part in selectivity. The gas-solid separation system of the present invention can guarantee a residence time for the gas in said separator of between 0.5 seconds and 3 seconds. Thus, it has a direct effect on controlling unwanted thermal degradation reactions in the context of catalytic cracking, and further of high severity cracking to co-produce a certain quantity of propylene.

More generally, the present invention is distinguished from prior art reactors both in the overall residence time in the reactor is not only completely controlled and in its distribution in the various zones of the reactor, namely the first reaction zone, the second reaction zone and the gas-solid separation system.

BRIEF DESCRIPTION OF THE INVENTION

Figure 1:
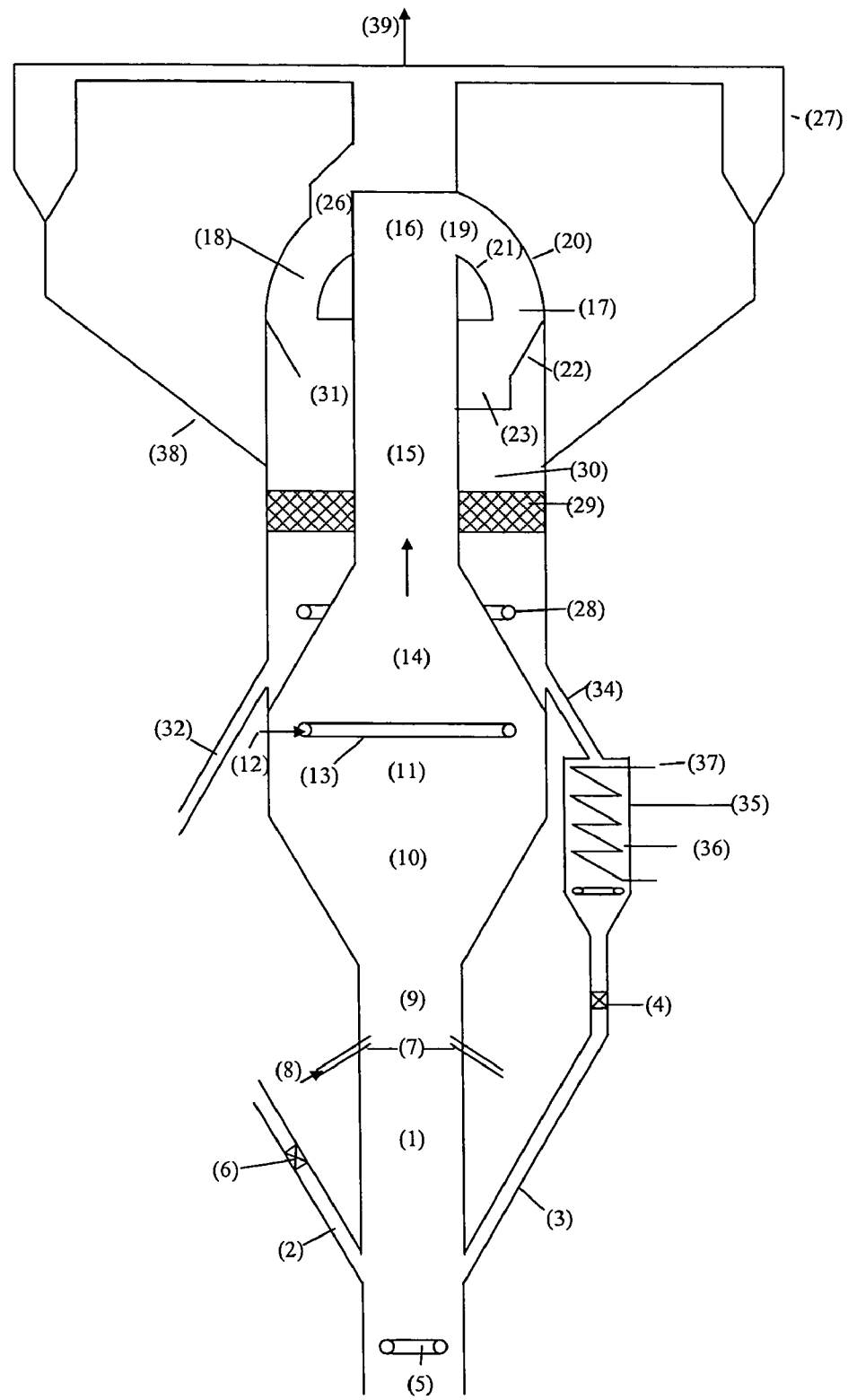
FIG. 1 shows a profile view of the reactor with its gas-solid separation system of the invention.

The present invention consists of a gas-solid reactor comprising, in the order of flow of the gas-solid suspension, at least one catalyst containment zone, at least one first reaction zone functioning in dense or fast bed mode, at least one second reaction zone functioning in entrained bed mode and directly connected to the end of the outlet from the first reaction zone, the second reaction zone being itself directly connected to a primary gas-solid separator. The reactor of the invention thus has a distribution of residence times between the various zones such that the residence time of the reagents in the first reaction zone is in the range 4 to 10 seconds, the residence time in the second reaction zone is in the range 0.5 to 5 seconds and the residence time in the primary separator is in the range 0.5 to 3 seconds.

The residence time in the primary separator generally represents less than 25% of the total residence time in the reactor, and preferably less than 10% of the total residence time in the reactor.

The gas-solid reactor of the present invention thus includes three distinct zones:

- a catalyst containment zone functioning in dense fluidization mode to provide the gas-solid suspension with a void fraction in the range 0.45 to 0.85, preferably in the range 0.5 to 0.6;
- a first reaction zone operating in dense or fast fluidization mode, supplied with a hydrocarbon cut, optionally mixed with steam;
- a second reaction zone directly following the first reaction zone in the reaction fluid flow direction and which functions in a transported fluidization mode. This second reaction zone may in some cases be supplied with a secondary hydrocarbon feed in addition to the effluents from the first reaction zone.

The second reaction zone is directly connected to the first reaction zone, which means that no other zone is located between the end of the outlet from the first reaction zone and the inlet end to the second reaction zone. Passage between the two zones may nevertheless be gradual and usually achieved by means of a conical shaped transition zone.

The second reaction zone is directly connected via its outlet end to the primary gas-solid separation system forming an integral part of the present invention.

A detailed description of the primary gas-solid separation system will be given in the remainder of the text.

The gas-solid reactor has a containment zone, two fluidized reaction zones and the integrated gas-solid separation system of the present invention is also characterized by the fact that the contact time in the second transported reaction zone is in the range 0.01 seconds to 0.5 seconds, preferably in the range 0.05 seconds to 0.3 seconds.

At the same time, the residence time for the reagents in this second reaction zone is generally from 0.5 seconds to 5 seconds.

The first reaction zone generally functions with a volume fraction in the range 0.55 and 0.9 and with superficial gas rates in the range 0.3 m/s to 5 m/s.

The rate of the gas-solid suspension at the inlet to the primary separator is generally in the range 5 to 50 m/s, preferably in the range to 30 m/s.

The residence time for the gas in the primary separator is generally in the range 0.5 seconds to 3 seconds.

The feed to be treated or primary feed is introduced into the catalyst containment zone located upstream of the first reaction zone. The reactor is then supplied with a hydrocarbon feed which may be mixed with steam in a proportion in the range 1% to 100% by weight, preferably in the range 2% to 25% by weight.

The second reaction zone is supplied with a secondary hydrocarbon feed with a molecular weight which is equal to or less than that of the primary feed supplying the first reaction zone.

A first application of the gas-solid reactor with two fluidized reaction zones of the present invention consists in the production of propylene, the primary feed being constituted by a hydrocarbon boiling mainly, i.e. at least 90%, below 560°, such as a gasoline, kerosene, gas oil or vacuum distillate, or a mixture of said cuts, the secondary feed being constituted by C4 and C5 oligomers.

A second application of the gas-solid reactor with two fluidized reaction zones of the present invention consists of producing C2/C3/C4 olefins from methanol.

A third application of the gas-solid reactor with two fluidized reaction zones of the present invention consists of converting solid biomass into liquid hydrocarbon cuts.

A fourth application of the fluidized bed reactor of the present invention consists of regenerating solid particles charged with coke, said regeneration being achieved by combustion in air or oxygen.

Clearly, the applications cited above do not limit the fields of application of the present invention which concerns any implementation of fluidized reactions in which control of the overall residence time in the reactor is an essential factor.

More precisely, the reactor of the invention is particularly suitable to controlling the overall residence time and its distribution in the various zones of the reactor, namely the first reaction zone operating in dense or fast fluidization mode, the second reaction zone operating in transported fluidization mode and the gas-solid separation system itself.

DETAILED DESCRIPTION OF THE INVENTION

The present invention describes a novel fluidized bed reactor comprising at least one catalyst containment zone, at least one first reaction zone operating in dense or fast fluidization mode followed by at least one second reaction zone operating in transported mode, and integrating a gas-solid separation system directly connected to the upper end of the second reaction zone.

The terms "first reaction zone," and "second reaction zone" should be understood to mean in the direction of flow of the reaction fluids, which is a vertical upflow.

The solid particles are introduced into a containment zone preceding the reaction zones through at least one supply line, said solid particles possibly in part deriving from a regeneration or a thermal exchange zone.

The term "regeneration" should be understood by the skilled person to mean restoring the catalyst activity by combustion Of the coke deposited during the reaction phases. In general, the used catalyst regeneration zone will function in fluidized bed mode.

Similarly, the thermal exchange zone may be of any type, but in the context of the present invention, it is preferably in fluidized bed mode.

In the remainder of the text, we shall speak, for simplicity, of the first reaction zone knowing that this functions in dense or fast fluidization mode and the second reaction zone knowing that said zone functions in transported fluidization mode.

The second reaction zone connects directly to the first reaction zone, which means that there is no other zone located between the outlet end from the first reaction zone and the inlet end to the second reaction zone, unless it is an optional connection zone, generally conical in shape.

Figure 2:
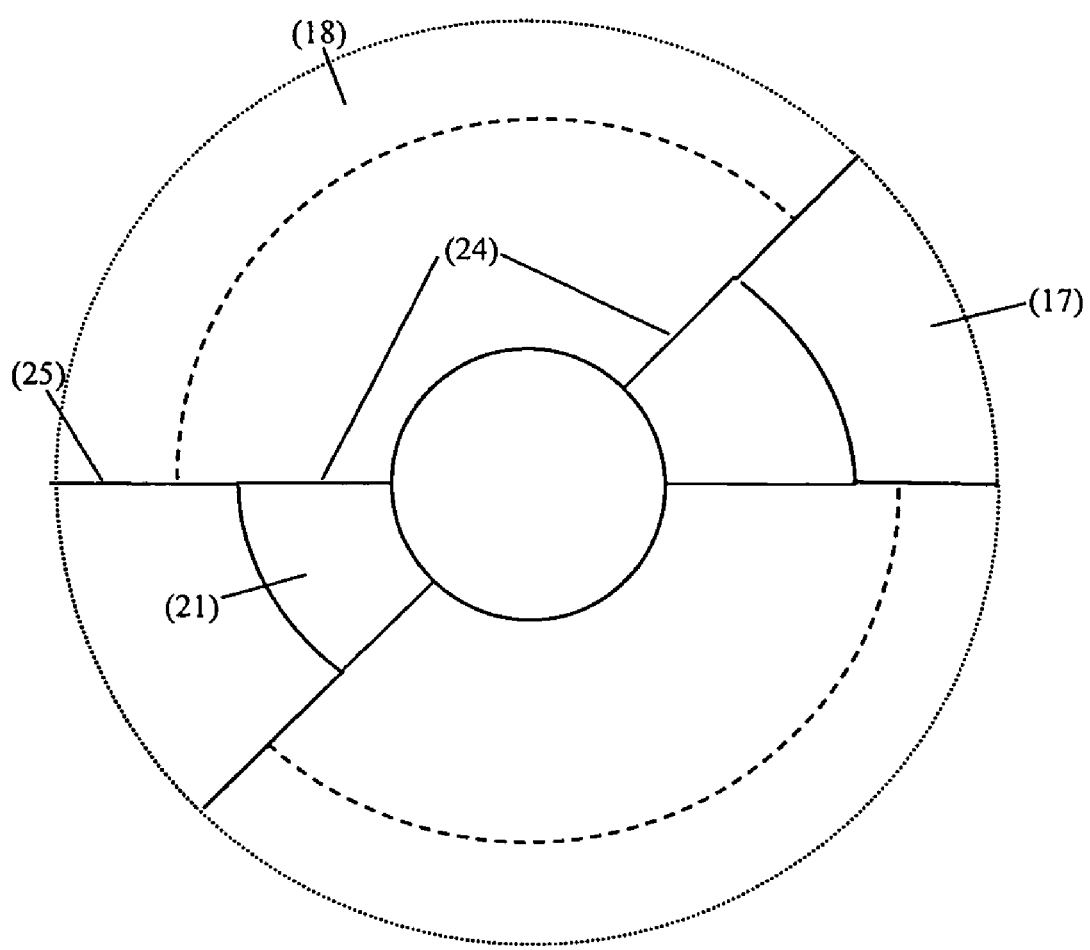
FIG. 2 shows a top view of a reactor of the invention to better illustrate the structure of the gas-solid separation system.

The remainder of the description will be better understood from FIGS. 1 and 2.

FIG. 1 shows a particular configuration of the reactor of the invention in which the particles are introduced into the catalyst containment zone operating in dense mode (1) using a supply line (2) for fresh or regenerated particles, and a supply line (3) for recycled particles deriving from the exchanger (35).

The fresh and recycled particles are mixed in the lower portion of the containment zone (1), generally by fluidization using a fluidization device (5).

The flow in the lower portion of the containment zone (1) is characterized by a void fraction in the range 0.45 to 0.85, preferably in the range 0.5 to 0.6.

The void fraction of a flow is defined as the ratio between the volume not occupied by particles and the sum of the unoccupied volume and the volume occupied by the particles.

The flow of fresh particles is controlled by a valve (6) located in the line (2), and the flow of recycled particles is controlled by a valve (4) located on the line (3).

The fluid reagents (8) are introduced into the base of the dense or fast phase reaction zone (9) by introduction means (7) to result in good distribution of said fluids over the whole of the section of the first dense or fast reaction zone (9).

The fluid reagents (8) may be introduced in the gas, liquid or mixed gas-solid phase state. When the fluid reagents are introduced in the liquid state, they are transformed into fine droplets using injectors (7) to facilitate vaporization in contact with solid particles.

The size of the liquid droplets from the injectors (7) is such that it is at a value close to the size of the solid particles, preferably lower.

The gas-solid reactions occur essentially in the first reaction zone (9), (10), (11) following the containment zone (1).

The first reaction zone may itself be divided into a certain number of zones operating in dense or fast fluidization modes. Said various reaction zones constituting the first reaction zone are characterized by a volume fraction in the range 0.55 to 0.9 and superficial gas rates in the range 0.3 to 5 m/s.

The values for the gas rate are given for solid particles with a size (Sauter diameter) generally in the range 40 to 100 microns. The present invention may be applied to particle sizes which are smaller or greater than the 40-100 micron range, the values of the gas rates then being adjusted to maintain the desired fluidization mode.

Preferably, the invention is applicable to particles the mean size (Sauter diameter) of which is between 25 microns and 1 mm, preferably between 50 and 500 microns, the grain density being from 500 to 5000 kg/m$^3$.

The contact zone between the feed and the solid particles (9) is followed by a gradually enlarging zone (10) which is conical in shape, itself being followed by an upper zone (11) having a volume sufficient to reach the residence time and contact times required by the chemical reaction.

The set of zones (9), (10) and (11) forms the first reaction zone.

It is possible to introduce an auxiliary fluid (12) into the upper portion of the first reaction zone (11) via a distribution means (13) such as, for example, wall mounted injection nozzles, or a ring (toroid cut by suitably dimensioned orifices) as shown in FIG. 1, or a tube cut with suitable dimensioned orifices, or any other system which is known to the skilled person.

Said auxiliary fluid (12) may be a cooling fluid intended to stop the reactions occurring in the reaction zone. This may also be a reagent having a substantially greater reactivity than the reagent or reagents introduced into the lower portion of the first reaction zone (9), (10) and (11).

The first reaction zone is terminated by a generally conical transition zone (14) which increases the rate of the gas above 5 m/s to transport the particle assembly towards the second transported bed reaction zone (15), (16).

The second transported bed reaction zone (15), (16) represents a relatively low volume compared with the first reaction zone (9), (10), (11).

Since the speed of the gas-solid suspension in this second reaction zone is fairly high, the gas residence time in said zone is short, and the chemical reactions occurring are generally negligible except possibly for very fast kinetic reactions.

Typically, the contact time for the reagents in the second reaction zone is less than 25%, preferably less than 20% of the total residence time in the entire reactor.

For this reason, only very fast reactions may continue to occur in a significant manner.

The optimum contact time for the reagents with the catalyst in the first reaction zone (9), (10), (11) is generally in the range 0.5 seconds to 15 seconds, preferably in the range 1 to 5 seconds.

The residence time for the reagents in the first reaction zone is generally in the range 2 to 25 seconds, preferably in the range 4 to 10 seconds.

The contact time in the second reaction zone is generally in the range 0.01 seconds to 0.5 seconds, preferably in the range 0.05 to 0.3 seconds.

The residence time for the reagents in the second reaction zone typically varies from 0.5 seconds to 5 seconds.

The upper portion of the second reaction zone (16) communicates with the integrated gas-solid separation system which consists of a series of separation chambers (17) and stripping chambers (18), said chambers being alternately disposed around the side of the second reaction zone (15), (16). Said integrated gas-solid separation system constitutes the primary separation.

In a preferred variation of the present invention, the number of separation chambers is equal to the number of stripping chambers.

Communication between the second reaction zone (16) and each of the separation chambers (17) is achieved by openings (19) in the side walls of the second reaction zone (16), said zone (16) having a closed upper section to force the gas-solid suspension to pass into said separation chambers via the side openings (19).

A deflector (21) forms a wall inside the separation chamber (17) which is substantially parallel to the rounded upper wall (20).

The upper zone of the separation chamber (17) is thus defined by the upper rounded wall (20) and by the deflector (21).

The gas-solid suspension thus rotates about the deflector (21) which can, by centrifugal Force, separate the solid particles evacuated to the lower portion of the separation chamber (17), from the gas charged with a minor part of solid particles which is evacuated to the stripping chamber (18) next to the separation chamber via the opening (24) visible in FIG. 2.

The solid particles recovered from the lower portion of the separation chamber (17) are then directed to the stripping zone (30) via the opening (23).

Following its passage into the upper portion of the separation chamber (17) and the largely dedusted gas is introduced into the stripping chambers (18) next to the separation chamber (17) via the opening (24) cut in the vertical wall (25) of said separation chamber (17) at a level located below the deflector (21).

The lower portion (31) of the stripping chamber (18) communicates with the stripping zone (30).

The gas charged with a minor portion of the solid particles is directed via the line (26) located in the upper portion of the stripping chamber (18) to a secondary gas-solid separation system shown in FIG. 1 as a set of cyclones disposed in parallel (27).

The solid particles separated by the secondary separation system are reintroduced into the reactor at the stripping zone (30) bit diplegs (38).

The dust-free gas from the secondary gas-solid separation system is evacuated via the line (39).

If needed, this secondary separation system may be completed by a third separation system which may be a second stage of cyclones, a set of multi cyclones or an electrostatic deduster.

In general, any dedusting system known to the skilled person and compatible with the reactor of the present invention may, depending on the required specifications, be placed downstream of the primary gas-solid separation system which forms an integral part of the fluidized bed reactor of the present invention.

Because of the mean concentration of solid particles in the gas in the primary gas-solid separator, which is between 5 and 500 times lower than in the second reaction zone operating in transported mode, the risk of developing secondary reactions in said primary separator, and a fortiori downstream thereof, is very low.

Further, the residence time for gas in the primary separator is generally in the range 0.1 to 10 seconds, preferably in the range 0.5 to 3 seconds.

The solid particles arriving in the stripping zone (30) from the separation chamber (17) are brought into contact, generally in counter current mode, with an inert fluid to displace the hydrocarbons adsorbed on the surface of the solid particles, and to recover the latter with the gas leaving the separation chamber (17) via openings (24).

The inert gas used to strip the solid particles may be steam, nitrogen, or any other gas which is inert to solid particles and with a relatively low molecular weight to reduce the partial pressure of the hydrocarbons.

Contact between the stripping gas and the solid particles is made using a distribution system (28) which, preferably, will cause dense fluidization of the solid particles, the level of the resulting fluidized bed preferably being located between the openings (23) and the openings (31).

With the aim of improving contact between the solid particles and the stripping gas, it is possible to arrange a mechanical contacting system (29) in the stripping zone (30).

Contacting systems which are known to the skilled person which may be cited in a non limiting manner include structured or bulk packing, systems based on baffles, or corrugated plates, which may or may not be inclined. Such systems encourage the solid particles to flow downwards while maintaining the upflow of the gas bubbles.

The present invention is not linked to any particular type of contacting system.

The solid particles may be extracted from the reactor at the stripping zone (30) via lines (32) or (34) to be directed at least in part either to a regeneration zone (not shown in FIG. 1), or directly recycled to the inlet to the fluidized bed reactor in the containment zone (1), or it may be introduced into a thermal exchange zone (35) before being re-introduced into the containment zone (1).

When a portion of the solid particles is introduced into a regeneration zone, the stream of particles may be controlled by a valve (6) which can maintain a predetermined level of the bed in the stripping zone (30).

The fluidized bed exchanger (35) contains an exchange bank (36) which may have a variety of forms which are compatible with fluidization of particles inside said exchanger.

The fluidization rate inside the exchanger (35) is generally in the range 5 cm/s to 1 m/s and preferably in the range 5 cm/s to 0.5 m/s.

Inside the exchange bank (36), a fluid (37) moves to provide heat if the solid particles have to be re-heated, or to eliminate heat if the solid particles have to be cooled.

The present invention is compatible with any heat exchange system operating in fluidized bed mode. Generally, the heat exchange fluid (37) used is steam.

The particles are re-introduced into the containment zone (1) of the reactor via a line (3) provided with a valve (4) for controlling the solid flow.

The reactor of the present invention may be applied to the catalytic cracking of hydrocarbon feeds under severe conditions with the aim of producing light and high added value hydrocarbons such as gasoline, LPG and propylene.

Said evolution of catalytic cracking is known as petrochemical FCC.

In such high severity catalytic cracking units, the feed may be a cut from the atmospheric distillation of crude oil, or a cut resulting from a first hydrocracking, hydrotreatment or oligomerization treatment.

The catalyst used is generally a silica-alumina containing significant quantities of USY or ReY zeolites.

The catalyst may also contain a certain quantity of ZSM-5 zeolite either directly mixed in the grain with other zeolites, or introduced in the form of separate particles.

The catalyst is divided into fine particles with a mean diameter (Sauter diameter) generally in the range 40 to 150 microns. It must be at least partially continuously regenerated, as in a conventional catalytic cracking unit.

The grain density of the particles is generally in the range 1000 to 1800 $kg/m^3$, preferably in the range 1300 to 1700 $kg/m^3$.

The cracking reactions occur at temperatures in the range 450° C. to 700° C., preferably in the range 520° C. to 600° C. The pressure is generally in the range 1 to 15 bars absolute, preferably in the range 1.1 to 3 bars absolute (1 bar=0.1 MPa).

Steam may be injected with the feed in amounts in the range 5% to 50% by weight with respect to the feed, to reduce the partial pressure of the hydrocarbons and encourage olefin selectivity.

To obtain high yields of propylene, it may be advantageous to inject a second hydrocarbon feed upstream of the second reaction zone operating in transported flow mode, for example a light gasoline or a gasoline cut deriving from a process for oligomerizing light C4-C5 type olefins.

The reactor of the present invention may in particular be applicable in connection with a conventional FCC unit operating on an atmospheric residue or a vacuum distillate, the term "connection" meaning that, for example, the gas from conventional FCC is partially introduced as a primary feed to the first reaction zone of the reactor of the present invention, and that a C4/C5 oligomer cut is introduced as a second feed to the second reaction zone operating in transported bed mode.

More generally, the primary feed could be constituted by a hydrocarbon boiling mainly (at least 90%) below 560°, such as a gasoline, kerosene, gas oil or vacuum distillate cut or a mixture of said cuts.

Such a configuration can maximize the propylene yield while limiting the production of cry gas.

A second application for the reactor of the present invention concerns the conversion of light hydrocarbons containing an oxygen atom, such as methanol, into light olefins (ethylene, propylene and butenes).

The catalyst used for said reaction generally contains SAPO34, a ZSM-5 or mordenite type zeolite or a mixture of these various elements.

The reactions are carried out at temperatures which are generally in the range 400° C. to 650° C. and at pressures in the range 1 to 15 bars absolute (1 bar=$10^5$ pascals), and preferably in the range 1 to 5 bars absolute with a low partial pressure of hydrocarbons obtained by injecting steam, this latter possibly representing 10% to 100% by weight of the methanol flow rate.

The catalyst must be continuously regenerated, as in a catalytic cracking unit.

The ratio of the flow rate of catalyst flowing to the regeneration zone to the fresh feed flow rate is generally in the range 2 to 100, preferably in the range 4 to 50.

The ratio of the flow rate of the catalyst recycled to the reactor to the flow rate of regenerated catalyst is generally in the range 0.5 to 10, preferably in the range 1 to 5.

A third possible application of the reactor of the present invention concerns the conversion of biomass into liquid effluents. The biomass is introduced as a solid possibly mixed with a liquid reagent or transported in a gas stream, to form a pseudo-fluid phase introduced into the reaction zone.

The cracking reactions may be thermal when an inert solid such as sand is used, or catalytic if a used catalyst type solid from FCC is used.

The reactions are carried out at temperatures which are generally in the range 450° C. to 900° C., preferably in the range 450° C. to 650° C., when the production of liquid effluents is to be maximized.

When the production of olefins is to be maximized, the temperature is preferably between 650° C. and 900° C. and the operating pressure is in the range 1 to 10 bars, generally diluting the biomass feed with a stream of water or steam which may reach 100% by weight of the biomass introduced.

The solid phase used in the process must generally be regenerated to burn off the coke deposited during biomass conversion.

A fourth possible application of the reactor of the present invention consists in regenerating coked particles which have been used in a catalytic cracking unit or particles which have been used as heat transfer fluid in a thermal process but which have also received a deposit of coke.

Generally, the amount of coke is in the range 0.5% to 5% by weight with respect to the particle weight, preferably in the range 0.5% to 1% by weight.

The temperature necessary for regeneration is generally in the range 550° C. to 990° C., preferably in the range 600° C. to 800° C., with a ratio of air to coke which is generally in the range 8 to 20, preferably in the range 10 to 15.

These applications are cited purely by way of illustration and do not limit the field of application of the present invention which encompasses any gas-solid reaction necessitating strict control of the residence time in the reactor, in particular in the gas-solid separation system associated therewith.

EXAMPLES OF THE INVENTION

The advantages of the reactor of the present invention will be better understood from the two examples given below which concern an application of the high severity catalytic cracking type producing olefins.

1) The first example compares a conventional fluidized bed reactor and the fluidized bed reactor of the present invention.

It compares the catalytic cracking of VGO (vacuum gas oil) under very severe conditions carried out in a conventional fluidized bed apparatus (LF in Table 1) and in a reactor of the invention using two reaction zones, the first reaction zone functioning in dense fluidized bed mode and the second reaction zone functioning in transported fluidized bed mode (NC in Table 1).

The principal operating conditions, the geometrical dimensions and the yield structures are shown in Table 1 below.

The conventional fluidized bed reactor is constituted by a dense phase surmounted by a dilute phase. The dense phase functions in fast fluidization mode and has a diameter of 4.42 m with a superficial fluids rate of 0.75 m/s. To limit entrainment, the dilute phase located above the dense phase has a larger cross section of 5.42 m and the superficial fluid rate is thus lower, i.e. 0.5 m/s.

Transport of particles in this diluted zone is thus relatively low and only fine particles are entrained towards the downstream separation zone.

This diluted zone thus does not operate in transported mode as only a portion of the particles undergoes entrainment. Thus, in this implementation, the residence time in the dilute phase above the dense fluidized bed or dense phase is longer than the residence time in the dense phase (20 seconds as opposed to 4.2 seconds), which encourages thermal degradation of the reaction products.

The fluidized bed reactor of the present invention (NC) is different in that the superficial rate in the first reaction zone is higher, i.e. 1.5 m/s (as opposed to 0.75 m/s in the conventional reactor) and the second reaction zone operates in transported mode at a superficial rate of 10 m/s.

All of the particles in this second reaction zone are thus transported.

The diameter of the first reaction zone is smaller than in the conventional fluidized bed reactor (3.13 m as opposed to 4.4 m). However, the contact time in the conventional fluidized bed reactor and in the fluidized bed reactor of the present invention is similar thanks to a slightly larger equivalent height.

The diameter of the second reaction zone is much lower (1.17 m as opposed to 5.42 m).

This considerably reduces the residence time in the second reaction zone, which reduces from 20 seconds in the conventional reactor to less than 1 second in the reactor of the invention.

These differences in geometries, fluidization rate and residence time result in a substantial gain in selectivity, as shown in Table 1.

Essentially, the result is:

less dry gas produced by thermal degradation;

less coke;

more gasoline and C3-C4 light cuts (LPG).

TABLE 1

|  | LF | NC |  |
| --- | --- | --- | --- |
| Temperature & pressure |  |  |  |
| Mean temperature | 565.00 | 565.00 | ° C. |
| Reactor outlet pressure | 2.00 | 2.00 | Bar |
| Feed (vacuum distillate) |  |  |  |
| KUOP | 12.40 | 12.40 | (*) |
| d 4.15 | 0.86 | 0.86 | (-) |
| Hydrogen content | 0.12 | 0.12 | (wt %) |
| Sulphur content | 13.50 | 13.50 | (wt %) |
| Feed flow rate | 9.78 | 9.78 | Kg/s |
| Steam content | 25.00 | 25.00 | (wt %) |

TABLE 1-continued

|  | LF | NC |  |
|---|---|---|---|
| First zone operating conditions |  |  |  |
| First zone diameter | 4.42 | 3.13 | (m) |
| First zone equivalent height | 3.14 | 8.00 | (m) |
| First zone superficial fluidization rate | 0.75 | 1.50 | (m/s) |
| First zone contact time | 1.52 | 1.52 | (s) |
| First zone residence time | 4.19 | 5.33 | (s) |
| Second zone operating conditions |  |  |  |
| Second zone diameter | 5.42 | 1.17 | (m) |
| Second zone equivalent height | 10.03 | 10.00 | (m) |
| Second zone superficial fluidization rate | 0.50 | 10.74 | (m/s) |
| Second zone contact time | 0.20 | 0.05 | (s) |
| Second zone residence time | 20.06 | 0.93 | (s) |
| Separation zone residence time |  | 1.00 | (s) |
| Yield structure |  |  |  |
| Dry gas (H$_2$S, H$_2$, C1, C2) | 8.20 | 5.70 | Feed wt % |
| LPG | 46.00 | 46.50 | Feed wt % |
| Gasoline (C5+, 200° C.) | 23.50 | 27.80 | Feed wt % |
| LCO + DO (200° C.+) | 14.50 | 13.50 | Feed wt % |
| Coke | 7.80 | 6.50 | Feed wt % |

2) The second example illustrates the operation of the reactor of the invention in cracking light hydrocarbons to produce a maximum amount of propylene.

The example uses a reactor or the invention using a succession of two reaction zones, the first operating in fast fluidization mode and the second operating in transported fluidization mode.

The principal feed is a cracking gasoline from a conventional FCC reaction zone.

A second feed is introduced into the inlet to the second reaction zone operating in transported mode. This second feed is a much more reactive gasoline essentially constituted by olefins obtained by oligomerizing C4-C5 cuts.

This oligomerization gasoline requires a much shorter contact time for catalytic cracking. Thus, it is particularly advantageous to inject it into the second reaction zone, which limits overcracking reactions and hydrogen transfer reactions which inevitably occur if this second feed is injected into the first, dense, reaction zone.

A fast separator as described in the invention allows fast separation in 0.5 seconds of the gas effluent and the solid particles which are reintroduced into the stripping zone of the reactor of the invention.

The reactor of the present invention can thus treat two feeds with very different reactivities while limiting degradation of the products formed. This results in maximizing products such as C3 and C4 olefins representing more than 45% by weight of the injected feeds.

This second example illustrates the possibility of using the present reactor in the production of olefins from first FCC gasoline feed, and a second oligomerization gasoline feed, said to Feeds being respectively sent to the first reaction zone and the second reaction zone to optimize olefin conversion.

TABLE 2

| Reactor outlet pressure | 2.0 | Bars abs |
|---|---|---|
| Mean reaction temperature | 600.0 | ° C. |
| First zone diameter | 3.11 | m |
| First zone equivalent height | 10.00 | m |
| First zone contact time | 1.90 | s |
| First zone residence time | 6.67 | s |
| Second zone diameter | 1.10 | m |
| Second zone equivalent height | 10.00 | m |

TABLE 2-continued

| Second zone contact time | 0.02 | s |
|---|---|---|
| Second zone residence time | 0.50 | s |
| Separation, residence time | 0.50 | s |
| Feed 1: cracking gasoline | | |
| Density d4.15 | 0.721 | (-) |
| Hydrogen | 14.21 | wt % |
| Sulphur | 550.00 | ppm by weight |
| Olefins content | 49.49 | wt % |
| Aromatics content | 14.88 | wt % |
| ASTM D2887 10% | 24 | ° C. |
| ASTM D2887 50% | 87 | ° C. |
| ASTM D2887 90% | 149 | ° C. |
| Gasoline flow rate | 50 | t/h |
| Steam content | 0.10 | (wt steam/wt gasoline) |
| Feed 2: oligomerization gasoline | | |
| Density d4.15 | 0.739 | (-) |
| Hydrogen | 14.42 | wt % |
| Sulphur | 0.00 | ppm by weight |
| Olefins content | 96.9 | wt % |
| Aromatics content | 0.0 | wt % |
| ASTM D2887 10% | 113 | ° C. |
| ASTM D2887 50% | 119 | ° C. |
| ASTM D2887 90% | 198 | ° C. |
| Gasoline flow rate | 25 | |
| Steam content | 0.10 | (wt steam/wt gasoline) |
| Dry gas (H$_2$, H$_2$S, C1, C2) | 5.4 | t/h |
| LPG | 39.0 | t/h |
| Propylene | 18.3 | t/h |
| Butenes | 16.8 | t/h |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, and in the examples, all temperatures are set forth uncorrected in degrees Celsius and, all parts and percentages are by weight, unless otherwise indicated. The entire disclosures of all applications, patents and publications, cited herein and of corresponding French application No. 05/13.208, filed Dec. 20, 2005, is incorporated by reference in.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various chances and modifications of the invention to adapt it to various usages and conditions.

The invention claimed is:

1. A gas-solid reactor comprising:
at least one catalyst containment zone (1), at least one first reaction zone operating in dense or fast mode (9), (10), (11), a fluidization device (5) in the lower portion of said at least one catalyst containment zone (1), means for supplying a primary feed to said at least one first reaction zone or to said at least one catalyst containment zone, at least one second reaction zone operating in transported mode (15), and a primary gas-solid separator wherein said second reaction zone is directly connected to said primary gas-solid separator, said primary separator comprising a series of separation chambers (17) and stripping chambers (18), said separation and stripping chambers being disposed alternately around the sidewalls of said second reaction zone (15), (16), each of the separation chambers (17) communicating with said second reaction zone (15), (16) via openings (19) provided in the side walls of the second reaction zone (16), each of said separation chambers (17) comprises a rounded upper wall (20) and a substantially parallel deflector (21) which separate, by the centrifugal effect, solid particles and largely dedusted gas, wherein said separation chamber (17) has a lower portion which receives the separated solid particles, and said lower portion of the separation chamber (17) is connected to a stripping zone (30) via openings (23), and wherein each of said stripping chambers (18) communicating with a separation chamber (17) via an opening (24), cut in the vertical wall (25) of the separation chamber (17) at a level located beneath the deflector (21), through which said largely dedusted gas is introduced into the stripping chambers (18), and said stripping chambers (18) having lower portions (31) which communicate with said stripping zone (30), and stripping chambers (18) having upper portions that communicate via line (26) with at least one secondary gas-solid separation system.

2. A gas-solid reactor according to claim 1, wherein said reactor comprises means for supplying a primary feed to be treated into said at least one catalyst containment zone.

3. A gas-solid reactor according to claim 1, wherein said reactor comprises means for supplying a primary feed to said at least one first reaction zone.

4. A gas-solid reactor according to claim 1, further comprising means for supplying to said second reaction zone a secondary hydrocarbon feed.

5. A gas-solid reactor according to claim 1, wherein said stripping zone (30) is provided with a mechanical system for contacting solid particles and stripping gas.

6. A gas-solid reactor according to claim 1, wherein said stripping zone (30) functions in dense bed mode and has a bed level between the openings (23) of the lower portion of the separation chambers (17) and the openings (31) of the lower portion of the stripping chambers (18).

7. A process for producing propylene comprising:

(a) providing a gas-solid reactor comprising at least one catalyst containment zone (1) containing solid catalyst particles, at least one first reaction zone operating in dense or fast mode (9), (10), (11), at least one second reaction zone operating in transported mode (15), and a primary gas-solid separator wherein said second reaction zone is directly connected to said primary gas-solid separator, said primary separator comprising a series of separation chambers (17) and stripping chambers (18), said separation and stripping chambers being disposed alternately around the sidewalls of said second reaction zone (15), (16), each of the separation chambers (17) communicating with said second reaction zone (15), (16) via openings (19) provided in the side walls of the second reaction zone (16), each of said separation chambers (17) comprising a rounded upper wall (20) and a substantially parallel deflector (21) for separating, by the centrifugal effect, solid particles and largely dedusted gas, each of said separation chambers (17) having a lower portion for receiving separated solid particles, and said lower portion being connected to a stripping zone (30) via openings (23), and each of said stripping chambers (18) communicating with at least one separation chamber (17) via an opening (24), cut in the vertical wall (25) of the separation chamber (17) at a level located beneath the deflector (21), through which said largely dedusted gas is introduced into the stripping chambers (18), and said stripping chambers (18) having lower portions (31) which communicate with said stripping zone (30), and said stripping chambers (18) having upper portions that communicate via line (26) with at least one secondary gas-solid separation system;

(b) operating said at least one catalyst containment zone operates as a fluidized bed in dense mode to provide a gas-solid suspension with a void fraction of 0.45-0.85;

(c) introducing gas-solid suspension from said at least one catalyst containment zone into said first reaction zone, and supplying a primary feed to said at least one first reaction zone, wherein said primary feed is constituted by a hydrocarbon, at least 90% of which boils below 560, the residence time for the gas in the first reaction zone is in the range of 4 to 10 seconds, said first reaction zone has a volume fraction in the range of 0.55 to 0.9, and said first reaction zone functions with a superficial gas rate in the range of 0.3 m/s to 5 m/s; and (d) introducing gas-solid suspension from said first reaction zone into said second reaction zone, and supplying to said second reaction zone a secondary hydrocarbon feed having a molecular weight which is less than or equal to that of said primary feed supplied to said first reaction zone, said secondary feed being constituted by C4 and C5 oligomers, wherein the residence time in said second reaction zone is in the range of 0.5 seconds to 5 seconds;

(e) introducing solids and gas from said secondary reaction zone into each of said separation chambers (17) of said primary separator, and separating solid particles and largely dedusted gas in said separation chambers (17) by the centrifugal effect, wherein the residence time in said primary separator is in the range of 0.5 to 3 seconds, and the flow rate at the inlet to said primary separator is in the range of 15 m/s to 30 m/s:

(f) introducing separated solid particles into said lower portion of each of said separation chambers (17);

(g) introducing separated solid particles from said lower portion of said separation chambers (17) into said stripping zone (30) via the opening (23);

(h) introducing largely dedusted gas into said stripping chambers (18) from said separation chambers (17) via openings (24), and introducing inert gas into said stripping chambers to remove solid particles from said largely dedusted gas; and (e) introducing solid particles and gas from said stripping chamber via line (26) to said at least one secondary gas-solid separation system, and discharging from said secondary gas-solid separation system gas from which solid particles have been removed via a line (39).

8. A process according to claim 7, wherein said stripping zone (30) is provided with a mechanical system for contacting solid particles and stripping gas.

9. A process according to claim 7, wherein said stripping zone (30) functions in dense bed mode and has a bed level between the openings (23) of the lower portion of the separation chambers (17) and the openings (31) of the lower portion of the stripping chambers (18).

10. A process for producing C2/C3/C4 olefins from methanol in a gas-solid reactor, said process comprising:

(a) providing a gas-solid reactor comprising at least one catalyst containment zone (1) containing solid catalyst particles, at least one first reaction zone operating in dense or fast mode (9), (10), (11), at least one second reaction zone operating in transported mode (15), and a primary gas-solid separator wherein said second reaction zone is directly connected to said primary gas-solid separator, said primary separator comprising a series of separation chambers (17) and stripping chambers (18), said separation and stripping chambers being disposed alternately around the sidewalls of said second reaction zone (15), (16), each of the separation chambers (17) communicating with said second reaction zone (15), (16) via openings (19) provided in the side walls of the second reaction zone (16), each of said separation chambers (17) comprising a rounded upper wall (20) and a substantially parallel deflector (21) for separating, by the centrifugal effect, solid particles and largely dedusted gas, each of said separation chambers (17) having a lower portion for receiving separated solid particles, and said lower portion being connected to a stripping zone (30) via openings (23), and each of said stripping chambers (18) communicating with at least one separation chamber (17) via an opening (24), cut in the vertical wall (25) of the separation chamber (17) at a level located beneath the deflector (21), through which said largely dedusted gas is introduced into the stripping chambers (18), and said stripping chambers (18) having lower portions (31) which communicate with said stripping zone (30), and said stripping chambers (18) having upper portions that communicate via line (26) with at least one secondary gas-solid separation system;

(b) operating said at least one catalyst containment zone operates as a fluidized bed in dense mode to provide a gas-solid suspension with a void fraction of 0.45-0.85;

(c) introducing gas-solid suspension from said at least one catalyst containment zone into said first reaction zone, and supplying a primary feed to said at least one first reaction zone, the residence time for the gas in the first reaction zone is in the range of 4 to 10 seconds, said first reaction zone has a volume fraction in the range of 0.55 to 0.9, and said first reaction zone functions with a superficial gas rate in the range of 0.3 m/s to 5 m/s; and (d) introducing gas-solid suspension from said first reaction zone into said second reaction zone, wherein the residence time in said second reaction zone is in the range of 0.5 seconds to 5 seconds;

(e) introducing solids and gas from said secondary reaction zone into each of said separation chambers (17) of said primary separator, and separating solid particles and largely dedusted gas in said separation chambers (17) by the centrifugal effect, wherein the residence time in said primary separator is in the range of 0.5 to 3 seconds, and the flow rate at the inlet to said primary separator is in the range of 15 m/s to 30 m/s;

(f) introducing separated solid particles into said lower portion of each of said separation chambers (17);

(g) introducing separated solid particles from said lower portion of said separation chambers (17) into said stripping zone (30) via the opening (23);

(h) introducing largely dedusted gas into said stripping chambers (18) from said separation chambers (17) via openings (24), and introducing inert gas into said stripping chambers to remove solid particles from said largely dedusted gas; and (e) introducing solid particles and gas from said stripping chamber via line (26) to said at least one secondary gas-solid separation system, and discharging from said secondary gas-solid separation system gas from which solid particles have been removed via a line (39).

11. A process according to claim 10, wherein said stripping zone (30) is provided with a mechanical system for contacting solid particles and stripping gas.

12. A process according to claim 10, wherein said stripping zone (30) functions in dense bed mode and has a bed level between the openings (23) of the lower portion of the separation chambers (17) and the openings (31) of the lower portion of the stripping chambers (18).

13. A method of operating a gas-solid reactor, said solid gas reactor comprising:

at least one catalyst containment zone (1), at least one first reaction zone operating in dense or fast mode (9), (10), (11), means for supplying a primary feed to said at least one first reaction zone, at least one second reaction zone operating in transported mode (15), and a primary gas-solid separator wherein said second reaction zone is directly connected to said primary gas-solid separator, said primary separator comprising a series of separation chambers (17) and stripping chambers (18), said separation and stripping chambers being disposed alternately around the sidewalls of said second reaction zone (15), (16), each of the separation chambers (17) communicating with said second reaction zone (15), (16) via openings (19) provided in the side walls of the second reaction zone (16), each of said separation chambers (17) comprises a rounded upper wall (20) and a substantially parallel deflector (21) which separate, by the centrifugal effect, solid particles and largely dedusted gas, wherein said separation chamber (17) has a lower portion which receives the separated solid particles, and said lower portion of the separation chamber (17) is connected to a stripping zone (30) via openings (23), and wherein each of said stripping chambers (18) communicating with a separation chamber (17) via an opening (24), cut in the vertical wall (25) of the separation chamber (17) at a level located beneath the deflector (21), through which said largely dedusted gas is introduced into the stripping chambers (18), and said stripping chambers (18) having lower portions (31) which communicate with said stripping zone (30), and said stripping chambers (18) having upper portions that communicate via line (26) with at least one secondary gas-solid separation system, said method comprising:

operating said at least one catalyst containment zone operates as a fluidized bed in dense mode wherein the residence time of reagents in said at least one catalyst containment zone is 4-10 seconds;

operating said at least one first reaction zone operates as a fluidized bed in dense mode or fast mode and wherein the residence time of reagents in said at least one first reaction zone is 0.5-5 seconds; operating said at least one second reaction zone operates as a fluidized bed in transported fluidization mode and wherein the residence time of reagents in said at least one second reaction zone is 0.5-3 seconds;

the flow rate of gas-solid suspension at the inlet to the primary separator is in the range of 15 m/s to 30 m/s; and said first reaction zone has a volume fraction in the range of 0.55 to 0.9, and said first reaction zone functions with superficial gas rates in the range of 0.3 m/s to 5 m/s.

14. A process for converting biomass into hydrocarbon cuts comprising operating a gas-solid reactor in accordance with claim 13, wherein a primary feed containing biomass is introduced into said at least one reaction zone.

15. A method according to claim 13, wherein the feed to be treated is introduced into said catalyst containment zone, and said catalyst containment zone has a void fraction in the range of 0.5 to 0.6.

16. A method of operating a gas-solid reactor, said solid gas reactor comprising:

at least one catalyst containment zone (1), at least one first reaction zone operating in dense or fast mode (9), (10), (11), means for supplying a primary feed to said at least one first reaction zone, at least one second reaction zone operating in transported mode (15), and a primary gas-solid separator wherein said second reaction zone is directly connected to said primary gas-solid separator, said primary separator comprising a series of separation chambers (17) and stripping chambers (18), said separation and stripping chambers being disposed alternately around the sidewalls of said second reaction zone (15), (16), each of the separation chambers (17) communicating with said second reaction zone (15), (16) via openings (19) provided in the side walls of the second reaction zone (16), each of said separation chambers (17) comprises a rounded upper wall (20) and a substantially parallel deflector (21) which separate, by the centrifugal effect, solid particles and largely dedusted gas, wherein said separation chamber (17) has a lower portion which receives the separated solid particles, and said lower portion of the separation chamber (17) is connected to a stripping zone (30) via openings (23), and wherein each of said stripping chambers (18) communicating with a separation chamber (17) via an opening (24), cut in the vertical wall (25) of the separation chamber (17) at a level located beneath the deflector (21), through which said largely dedusted gas is introduced into the stripping chambers (18), and said stripping chambers (18) having lower portions (31) which communicate with said stripping zone (30), and said stripping chambers (18) having upper portions that communicate via line (26) with at least one secondary gas-solid separation system, said method comprising:

introducing catalyst particles and fluidization gas into said at least one catalyst containment zone, wherein said at least one catalyst containment zone operates as a fluidized bed in dense mode to provide a gas-solid suspension with a void fraction of 0.45-0.85, said at least one first reaction zone receiving gas-solid suspension from said at least one catalyst containment zone;

introducing hydrocarbon feed, optionally mixed with steam, via said means for supplying primary feed a primary feed to said at least one first reaction zone, into said at least one first reaction zone wherein said at least one first reaction zone operates as a fluidized bed in dense mode or fast mode, said at least one second reaction zone receiving gas-solid suspension from said at least one first reaction zone; and operating said at least one second reaction zone as a fluidized bed in transported fluidization mode, and said primary gas-solid separator receiving gas-solid suspension from said at least second reaction zone;

wherein the flow rate of gas-solid suspension at the inlet to the primary separator is in the range of 15 m/s to 30 m/s;

the residence time for the gas in said at least one first reaction zone is in the range 4 to 10 seconds, the residence time in said at least one second reaction zone is in the range 0.5 seconds to 5 seconds, and the residence time in said primary separator is in the range 0.5 to 3 seconds; and said first reaction zone has a volume fraction in the range of 0.55 to 0.9, and said first reaction zone functions with superficial gas rates in the range of 0.3 m/s to 5 m/s.

17. A method according to claim 16, wherein the flow rate of the gas-solid suspension at the inlet to said primary gas-solid separator is in the range 5 to 50 m/s.

18. A method according to claim 16, wherein the flow rate of gas-solid suspension at the inlet to said primary gas-solid separator is in the range 15 m/s to 30 m/s.

19. A method according to claim 16, further comprising introducing feed to be treated into said at least one catalyst containment zone.

20. A method according to claim 18, wherein the gas-solid suspension in said at least one catalyst containment zone has a void fraction of in the range 0.5 to 0.6.

21. A method according to claim 20, wherein said primary feed is gasoline, kerosene, a gas oil or vacuum distillate cut, or a mixture thereof.

22. A method according to claim 16, said at least one first reaction zone has a volume fraction in the range 0.55 to 0.9, and the superficial gas rate is in the range 0.3 m/s to 5 m/s.

23. A method according to claim 16, the contact time in said at least one second reaction zone is in the range 0.01 seconds to 0.5 seconds.

24. A method according to claim 16, wherein the residence time in said primary gas-solid separator is in the range 0.5 to 3 seconds.

25. A method according to claim 16, wherein the feed to be treated is introduced into said catalyst containment zone, and said catalyst containment zone has a void fraction in the range of 0.5 to 0.6.

* * * * *

UNITED STATES PATENT AND TRADEMARK OFFICE
CERTIFICATE OF CORRECTION

PATENT NO. : 7,655,822 B2 Page 1 of 1
APPLICATION NO. : 11/641113
DATED : February 2, 2010
INVENTOR(S) : Ross et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Twenty-third Day of November, 2010

David J. Kappos
*Director of the United States Patent and Trademark Office*